US012786945B1

(12) United States Patent
Gencel et al.

(10) Patent No.: US 12,786,945 B1
(45) Date of Patent: Nov. 3, 2026

(54) LOCALIZATION SERVICES FOR WIRELESS NETWORKS

(71) Applicant: Amazon Technologies, Inc., Seattle, WA (US)

(72) Inventors: Muhammed Faruk Gencel, Poway, CA (US); Ravi Ichapurapu, Morgan Hill, CA (US); Moulik Bhardwaj, Una (IN); Uttam Bhat, Bangalore (IN); Basak Oyman, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 435 days.

(21) Appl. No.: 18/475,078

(22) Filed: Sep. 26, 2023

(51) Int. Cl.
*H04W 64/00* (2009.01)
*H04B 17/318* (2015.01)
*H04W 88/16* (2009.01)

(52) U.S. Cl.
CPC ........ *H04W 64/003* (2013.01); *H04B 17/318* (2015.01); *H04W 88/16* (2013.01)

(58) Field of Classification Search
None
See application file for complete search history.

(56) References Cited

U.S. PATENT DOCUMENTS 9,668,233 B1 * 5/2017 Horner .................. H04W 64/00
2016/0302033 A1 * 10/2016 Cardno .................. H04W 4/60
2017/0156027 A1 * 6/2017 Peng .................. H04W 4/021
2022/0397636 A1 * 12/2022 Wang .................. G01S 5/0268
2023/0273289 A1 * 8/2023 Veith .................. G01S 5/02213 342/451
2024/0114318 A1 * 4/2024 Clayton .................. H04W 4/80

* cited by examiner

*Primary Examiner* — Rafael Pérez-Gutiérrez
(74) *Attorney, Agent, or Firm* — Knobbe, Martens, Olson & Bear, LLP

(57) ABSTRACT

The present disclosure generally relates to privacy-based client device location estimation service. An actual location of a plurality of gateways deployed in the network coverage area is obfuscated into an attributed location of the subregion, where the network coverage area is divided into multiple subregions. Individual gateway of the plurality of gateways receive the modulated signal from at least one client device and measure the strength of the signals of the received signal. The localization service implemented in the network service provider receives the measured strength of the signals and processes the received signal for individual gateway by normalizing the measured strength of the signal with respect to other gateways. The localization service can estimate the location of the client device based on the processed results and the attributed location corresponding to individual gateways.

20 Claims, 11 Drawing Sheets

LOCALIZATION SERVICES FOR WIRELESS NETWORKS

BACKGROUND

Mobile electronic devices are increasingly ubiquitous. Such devices have wide and varied functionality. For many of these devices, it can be useful to be able to determine a location of the electronic device. Global navigation satellite systems are commonly used for this purpose, with multi-iteration being utilized to determine a position of an electronic device based on a plurality of signals received at the device from satellites in orbit. However, the components needed to use a Global Navigation Satellite System (GNSS) approach increase the cost of an electronic device and also increase power usage.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1A:
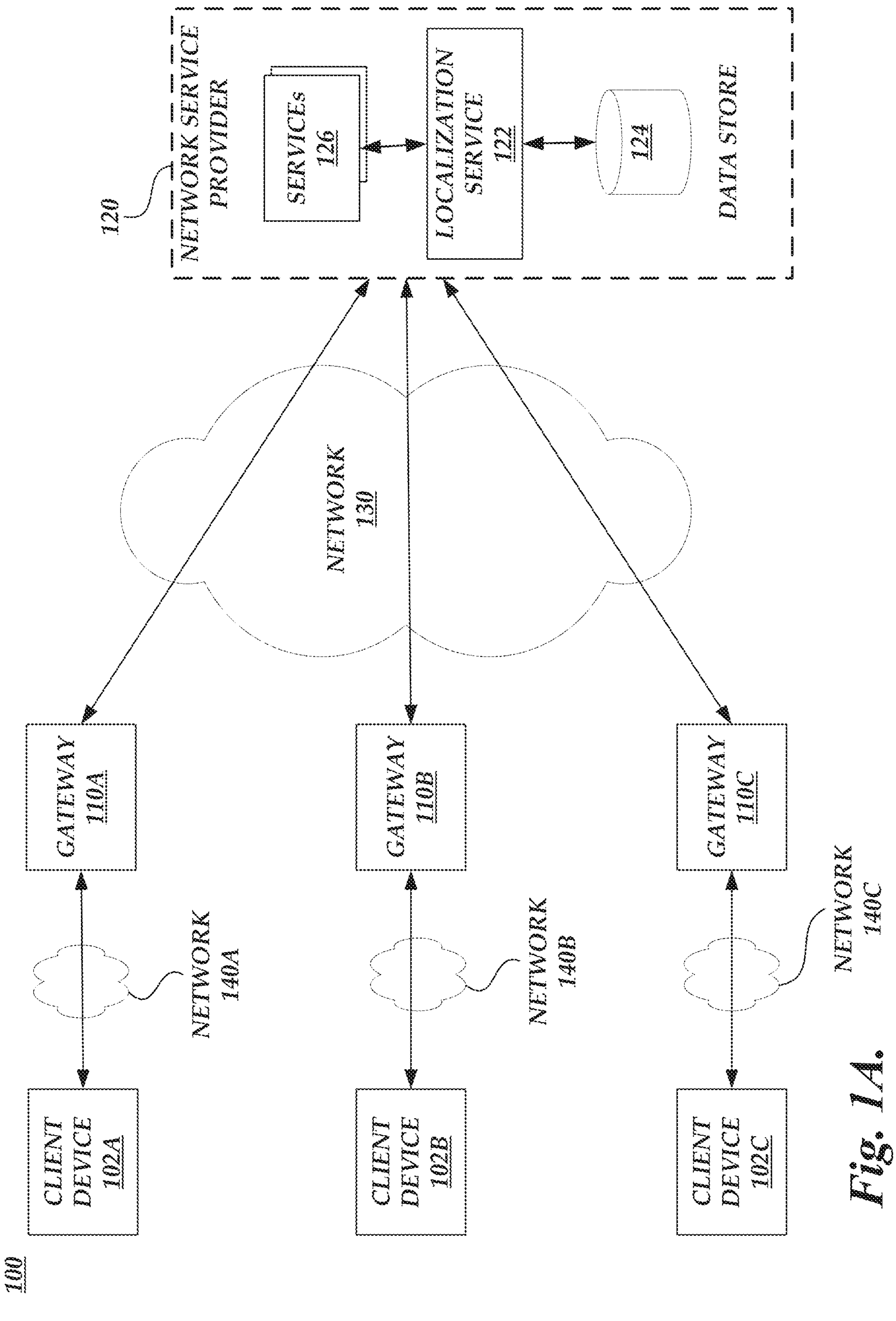
FIG. 1A depicts a block diagram of a system for providing privacy based client device location service in which various embodiments, according to the present disclosure, can be implemented.

In the following description, various examples will be described. For purposes of explanation, specific configurations, and details are set forth in order to provide a thorough understanding of the examples. However, it will also be apparent to one skilled in the art that the examples may be practiced without specific details. Furthermore, well-known features may be omitted or simplified in order not to obscure the examples being described.

Generally described, aspects of the present disclosure relate to the localization of an electronic device using gateways for a wide area network. Specifically, aspects of the present application relate to a network service that determines location information for a client device based on wireless communications with one or more gateways. The wireless network includes one or more gateways that can transmit, receive, and exchange data to facilitate endpoint users to share resources and communicate with network services (e.g., network services provided by network service provider).

Illustratively, one or more aspects of the present application correspond to implementation in computer networks in which a plurality of gateways has been configured in a manner that various identifying information, including location information of the gateway, is not made publicly available or otherwise obfuscated to the client devices. By way of illustrative example, the plurality of gateways can correspond to electronic devices that are not configured as single purpose, dedicated gateways. Rather, these gateways correspond to a larger variety of computing devices, for example, the consumer electronic devices, home appliances, office equipment, and the like. Independent of a primary functionality (e.g., a home assistant), the gateways have connectivity with various local networks and have been further configured to grant communication network access to client devices outside of a respective local network. Such implementations can provide client devices with access to a communication network as mobile client devices traverse a geographic area and become physically proximate to the plurality of gateways (e.g., gateways). Such gateways may comprise, for example, audio assistant devices, alarm base station devices, wireless router or access point devices, security camera devices, video doorbell devices, etc.

Generally described, individual gateways can be configured to communicate with nearby client devices. Gateways may be configured to communicate with client devices utilizing various modulation schemes and networking protocols. For example, in an exemplary implementation, gateways are configured to communicate using a sub-GHz chirp spread spectrum modulation scheme (e.g., LoRa), a sub-GHz frequency shift keying modulation scheme, a sub-GHz orthogonal frequency division multiplexing modulation scheme, a Bluetooth Low Energy scheme, and a Wi-Fi scheme.

In accordance with one or more implementations, to facilitate communications using a sub-GHz frequency shift keying modulation scheme, gateways periodically broadcast beacon messages that are received by client devices and used to establish a connection. In accordance with one or more implementations, networking operations utilizing a sub-GHz chirp spread spectrum modulation scheme do not involve broadcasting a similar beacon. In accordance with one or more implementations, a gateway is configured to periodically or continuously listen for a transmission from a client device utilizing a sub-GHz chirp spread spectrum modulation scheme. In accordance with one or more implementations, a gateway is configured to communicate with a client device utilizing a Bluetooth low energy scheme. In accordance with one or more implementations, a gateway is configured to communicate with a remote system via a Wi-Fi 33 connection, Ethernet connection, or other wired or wireless connection, e.g., over a wide area network such as the Internet. In accordance with one or more implementations, such a remote system is configured to receive data from a gateway corresponding to a message received from a client device and communicate data to a gateway for communication onward to a client device. In accordance with one or more implementations, these gateways and the remote system can be characterized as forming an overlay network that overlays a wide area network (e.g., the Internet) and one or more wireless networks.

In accordance with one or more implementations, a gateway includes a GNSS receiver (e.g., a global positioning system receiver) and is configured to determine its own location. In accordance with one or more implementations, a gateway sends data indicating its location (e.g., GPS coordinates) to a remote system. In accordance with one or more implementations, a gateway that receives a transmission from a client device may send to a remote system an indication of its location as well as one or more time stamps indicating, e.g., the time that the transmission was received and/or a time that the gateway's location was last determined. In accordance with one or more implementations, a remote system may store location information for a plurality of gateways.

One or more aspects of the present disclosure are directed to a localization service implemented in the network resources provided by the network service provider (e.g., in a remote system representing a cloud service) in network environments utilizing gateways with obfuscated location information. Generally described, the localization service is configured to estimate the location of client devices based on signals (and information received from the signals) received from gateways. Illustratively, a network made up of a plurality of gateways is configured to communicate with the network resources via wireless or wired communication. Each gateway within the plurality of gateways is configured to transmit data associated with communications with client devices to the network resources (e.g., the localization service). This data might include information originally sent from client devices, with one or more gateways receiving this data from the client devices and then forwarding it to the network resources. A portion of this data may encompass signal information, such as communication signal characteristics (e.g., signal strength) between the gateway and the client device.

As described above, for at least a subset of the available gateways, the exact locations of one or more gateways involved may be unknown or obfuscated, with accurate location information related to the gateway not being used by the localization service. In accordance with some implementations, the location of a gateway is approximated to a location that differs from the actual gateway location. For example, in one embodiment, a geographic area may be subdivided into a plurality of subregions with each subregion defined with at least one geographic point that will be used as the proximate location for all gateways encompassed in the subregion.

In an illustrative embodiment, a client device may transmit a signal that is received by a plurality of gateways. Each gateway can process and transmit to the localization service the communication signal characteristics associated with the respective received signal. Thereafter, the localization service may estimate the location of the client devices by analyzing the signal characteristics received from each client device relative to these attributed locations. For instance, it might identify the signal strength (e.g., the strength of the signal received from the client device) within each subregion relative to the attributed location. The localization service can then process this identified signal strength in each subregion and compare it with other subregions. Next, it may determine which subregion exhibits the highest signal strength. By comparing the processed signal strengths in adjacent subregions, the service can further pinpoint a sub-portion within each subregion, providing a more accurate estimation of the client device's location.

The gateway, as disclosed herein, can be implemented as an access point that allows network traffic to flow from one network to another. For example, a gateway and one or more client devices can be configured in a local area network (LAN), while the gateway and a network service (e.g., network server provided by network service provider) can be configured in a wide area network (WAN) covering a large geographical area. In this example, to establish communication paths between the client devices and the network service, the gateway can be implemented as an access point and configured to receive data from the client device, process the received data to transmit the data in the WAN, and transmit the processed data to the network service via the WAN. In addition, the gateway may process the received data by converting its communication protocol to the WAN protocol in this example.

In accordance with one or more aspects of the present application, the gateways are configured to provide a network infrastructure (e.g., wireless communication) that can connect a plurality of client devices to one or more network servers provided by a network service provider. The gateways can provide the functionality to extend the coverage of the client devices and enable the client devices to stay connected over longer distances than they would be able to without the gateways. Illustratively, a plurality of gateways are distributed in a wide geographical area, and the client devices in the area may stay connected to one or more gateways or may communicate with nearby gateways without establishing a connection. For example, a client device, moving within the area, stays connected with one or more nearby gateways, so the client device is continuously connected with the network service provided by the network service provider. Or, as another example, a client device transmits a message with no knowledge of whether a gateway might be in the area able to receive it. The gateway receives the message, sends data corresponding to the message to a remote system, and receives back second data, including timing information that it uses to transmit a message to the client device.

In certain aspects of the present application, a device may be configured to function as both a gateway and a client device. For example, a stationary computing device, such as a security camera, may encompass the gateway functionality, using it to transmit data to the network resource. This integrated gateway may also receive data from nearby client devices, such as trackers, smart speakers, etc., and route this data to the network service provider. In this scenario, the gateway not only sends its own image data to a network server provided by the service provider but also acts as a connecting hub for other nearby devices, channeling their data to the network as well.

In accordance with one or more aspects of the present application, one or more client devices can correspond to computing devices that are configured as a collective network of devices and the technology that facilitates communication between devices and the network. Illustratively, the client devices may be generally referred to as the Internet of Things (IoT devices). Generally described, IoT devices are network devices with a primary function other than general-purpose computation. The IoT devices can be configured to generate data, such as messages, for transmission to network services with a messaging protocol, such as the LoRa (Long Range) messaging protocol. The IoT device can also generate data by utilizing various modulation techniques, such as chirp spread spectrum modulation, frequency key shifting (FSK), etc. In the deployment of the IoT devices, a plurality of IoT devices can be deployed to communicate with a network service provider that each of the plurality of IoT devices is generating data and transmitting it to the network service provider. For instance, a voice controller used in a household could function as an IoT device. If adopted by a million households, this would lead to the generation of voice controller data from those millions of homes. This data can then be exchanged and processed within a network through the utilization of gateways in some embodiments as disclosed herein. The network communication protocol, according to one or more aspects of the present disclosure, may further include one or more wireless networks, such as a Global System for Mobile Communications (GSM) network, a Code Division Multiple Access (CDMA) network, a Long-Term Evolution (LTE) network, or any other type of wireless network. For example, the network communication protocols used herein may include Hypertext Transfer Protocol (HTTP), HTTP Secure (HTTPS), Constrained Application Protocol (CoAP), and the like. Protocols and components for communicating via the Internet or any of the other aforementioned types of communication networks are well known to those skilled in the art and, thus, are not described in more detail herein.

In general, traditional networks that deploy multiple client devices, including Internet of Things (IoT) devices, rely on standard gateways for routing, relaying, transmitting, and receiving data between the client devices and the network server maintained by the network service provider. These individual gateways often have to incorporate both GPS tracking hardware and software components to estimate the locations of client devices and relay this information to the network service provider. This enables tracking or monitoring of the client devices. For example, a gateway, communicatively connected to one or more client devices, processes the received data by appending the gateway's location information derived from the GPS system in the gateway. It then transmits both the data from the client devices and the gateway's location to the network service provider, allowing the latter to estimate the client devices' locations. However, this traditional approach poses substantial technical challenges for both client devices and network service providers. Specifically, the necessity to include a GPS system, consisting of both hardware and software components in each gateway, leads to additional costs. This can significantly impact the bill of materials (BOM) cost, primarily due to the implementation of the GPS hardware.

In another aspect, both the traditional gateway and network service provider face challenges in managing the power consumption of the gateway efficiently. For instance, the gateway might need to keep the GPS component powered on continuously or semi-continuously to receive the GPS signal. The client devices may also need to continuously or semi-continuously communicate with the gateways to receive the GPS signal. In certain scenarios, the gateway may persistently activate its functionality to search for the GPS signal, even when not actively using it. Consequently, traditional networks may struggle to efficiently regulate power consumption for each gateway, leading to potential energy waste and decreased operational efficiency. In another aspect, when the gateways send data to the network service provider, they may also need to transmit the location information of the gateways. As a result, the network service provider has access to this location information. This could mean that the users or administrators of the gateways might not be able to keep the location information private and secure.

To address at least a portion of the above-described deficiencies, one or more aspects of the present disclosure correspond to systems and methods for estimating the locations of client devices based on the signal received by the gateways from each client device. According to one or more embodiments, as disclosed herein, a localization service can estimate the locations of client devices based on measured signal strength at the gateways and obfuscated locations of the gateways (e.g. based on receiving an obfuscated location rather than an actual location of a gateway, or based on determining an obfuscated location for a gateway for which accurate location information has been received). The actual location of the gateways is transformed (e.g., obfuscated) into one or more attributed locations, representing attributed locations that differ from the gateways' true geographical positions. These attributed locations can be thought of as artificial or simulated locations. The localization service may store the attributed locations, along with the associated gateways for each one (and may also store an accurate location if received). For instance, an attributed location might correspond to a specific region on a map. Different areas on the map can be characterized by various attributed locations, with the localization service storing both the defined regions and the gateways within each region. Within this framework, the actual location of the gateways is represented by the corresponding attributed locations.

The localization service may also receive signal strength information from the gateways, with the strength indicating the power level of the signal received from client devices. By processing the signal strength for each attributed location associated with the client device, the localization service can estimate the client device's location. This is done by comparing the signal strength for each corresponding attributed location, allowing for a more nuanced understanding of the client device's position.

In accordance with one or more embodiments, a gateway is configured to measure the strength of a signal received from one or more client devices. The client devices may transmit data using a modulated signal. Modulation can be achieved through various means, such as manipulating the amplitude, frequency, or phase of the signal. Examples of modulation techniques include LoRa (Long Range) and Frequency Shift Keying (FSK), among others. In some embodiments, individual gateways may have built-in capabilities to measure signal strength. This could include a module containing instructions specifically for measuring the strength of the signal. The power of the received signal from the client device can be quantified as the Received Signal Strength Indicator (RSSI), a metric commonly used to assess a signal's power level. For example, an RSSI value may be determined based on a voltage level from a baseband signal chain before a baseband amplifier. Output from an RSS circuit may be an analog direct current voltage level. This output can be sampled by an analog-to-digital converter (ADC) to determine RSSI values for a given time. A voltage value (in volts) sampled by an ADC may be converted to a power value for a given impedance Z, e.g., $P=V*V/Z$. However, in order to convert this into an RSSI value, it is generally desirable to have this power value expressed in decibels per milliwatt, e.g. $P(dbm)=10*Log\ 10(1000*P)$. Accordingly, a voltage value (in volts) sampled by an ADC may be converted to an RSSI value (in decibels per milliwatt) using, e.g., a formula such as $P(dbm)=10*Log\ 10(1000*V\hat{}2/Z)$.

Additionally, measuring the strength of the signal may involve consideration of a Signal to Noise Ratio (SNR). SNR can be characterized as a desired signal's received signal strength (RSS) relative to the thermal noise of the receiving device as integrated by the signal bandwidth. Both the RSS and SNR can be predicted or determined at a receiving device without the need for explicit feedback from a transmitting device. Together, RSSI and SNR provide valuable insights into both the strength and quality of the signal being received by the gateway, enabling more robust and reliable communication within the network.

In accordance with one or more embodiments, the network service provider may divide the map into a plurality of sub-regions, with each sub-region defining an obfuscated gateway location that represents an attributed location. Within this structure, the exact location of the gateways in each sub-region is associated with the corresponding attributed location, effectively concealing the precise physical locations. For instance, each sub-region or attributed location can be described or characterized as a geographic shape of a tile such that a plurality of tiles can be configured to overlay a specified geographic region. Illustratively, a center point of each tile serves as the attributed location for that tile. Consequently, the attributed location of the gateways contained within each tile is associated with that center point, rendering the exact locations of the gateways unknown to the network service provider or otherwise not requiring the use of the actual location of the gateways as part of localization services (even if known).

In some embodiments, the localization service implemented in a network service provider may receive signal strength information related to client devices from one or more gateways. Illustratively, a client device might transmit its signal to nearby gateways, each of which measures the strength of the signal received from the client device. These gateways then send the measured signal strength to the localization service. In some embodiments, the localization service processes the received signal strengths based on the attributed locations, such as tiles representing subregions that include one or more gateways. For example, the localization service may store the attributed location along with its associated gateways. Upon receiving the signal strength from the gateways, the localization service can then identify this received signal strength based on the attributed location. The localization service may analyze the strength of the signals within each tile to estimate the client device's location. In one scenario, assume tiles "A" and "B" are arranged adjacent to each other in an overlay of a region. If gateways located within tile A and tile B have the same or nearly the same signal strength, the attributed location of the client device might be estimated as somewhere between the attributed locations of tiles A and B (e.g., the center points of the two tiles). In a different scenario, if the signal strength received at the gateway(s) in tile A is greater than the signal strength received at the gateway(s) in tile B, the attributed location of the client device would be weighed in a manner with the location of tile A having a greater influence.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1A depicts a block diagram of an embodiment of the system 100. The system 100 can include client devices 102A, 102B, 102C, gateways, 110A, 110B, 110C, and network service provider 120. Illustratively, a client device and a gateway are connected via network. For example, client devices 102A, 102B, 102C and gateways, 110A, 110B, 110C are connected via network 140A, 140B, and 140C, respectively. In addition, the gateways, 110A, 110B, 110C, and network service provider 120 are connected via the network 130. Illustratively, the various aspects associated with the network service provider 120 can be implemented as one or more components that are associated with one or more functions or services. The components may correspond to software modules implemented or executed by one or more customer computing devices, which may be separate stand-alone customer computing devices. Accordingly, the components of the network service provider 120 should be considered as a logical representation of the service, not requiring any specific implementation on one or more customer computing devices.

Network 130, as depicted in FIG. 1A can connect any number of gateways. The network 130 is generally referred to as a backbone network. In some embodiments, a network service provider 120 provides the estimated location of the client devices to network-based services 126 that can utilize the location for providing the services. A network service provider 120 can implement a localization service 122 and data store 124. The network service provider 120 can provide on-demand network access to a shared pool of configurable computing resources that can be programmatically provisioned and released in response to network configuration. These resources can be dynamically provisioned and reconfigured to adjust to the variable load. The concept of "cloud computing" or "network-based computing" can thus be considered as both the applications delivered as services over the network and the hardware and software in the network service provider. In some embodiments, the network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the internet or any of the other aforementioned types of communication networks are well known to those skilled in the art and, thus, are not described in more detail herein. In some embodiments, the network 130 may include some or all of the same communication protocols, services, hardware, etc. Thus, although the discussion herein may describe communication between the gateway and the network service provider 120 via the network 130 is not limited in this manner. The various communication protocols discussed herein are merely examples, and the present application is not limited thereto.

The client devices 102A, 102B, 102C in FIG. 1A can connect to the network 140A, 140B, 140C and the gateways 110A, 110B, 110C, respectively. The client devices 102A, 102B, 102C may be representative of Internet on things (IoT) devices. The client devices 102A, 102B, 102C can also be a computing network associated with a plurality of customer computing devices. For illustration purposes, client devices 102A, 102B, 102C represent data generation and transmission and/or the client's action to access network services, such as web service, clouding service, etc. Generally described, IoT devices are network devices with a primary function other than general-purpose computation. The IoT devices can be configured to generate data, such as messages, for transmission to network services with a messaging protocol, such as the LoRa protocol. In the deployment of the IoT devices, a plurality of IoT devices can be deployed to communicate with a network service provider that each of the plurality of IoT devices is generating data and transmitting it to the network service provider through the gateway. For example, a voice controller in a household can be the IoT device, and if a million households use the voice controller, the voice controller data can be generated from the millions of the households and exchanged and processed within a network. The network 140 can generally referred to as a frontend network.

In some embodiments, the client devices 102A, 102B, 102C may continuously send beacon signals to scan nearby gateway. The beacon signal can be transmitted at regular intervals and contain identification information. The client devices 102A, 102B, 102C may also configured to receive any response signal from the gateways, where the response signal is generated by the gateway in response to receiving the beacon signal. Once the client devices 102A, 102B, 102C receive the response signal from one or more gateways, the client device and these gateways are connected via the network 140A, 140B, 140C. In some cases, the client devices 102A, 102B, 102C may generate data and modulate the data into a specific modulated signal to transmit the data to the gateway, such as LoRa or FSK modulated signal. The number of client devices 102A, 102B, 102C and gateways 110A, 110B, 110C, as disclosed herein, is not limited to any specific number.

In some embodiments, the networks 140A, 140B, 140C can include low power wide area network (LPWAN). The networks 140A, 140B, 140C can also comprise any combination of wired and/or wireless networks, such as one or more direct communication channels, local area network, wide area network, personal area network, and/or the Internet, for example. In the example of FIG. 1A, communication between the client device and the gateway may be performed via a short-range communication protocol, such as Bluetooth, Bluetooth low energy ("BLE"), and/or near field communications ("NFC"). The networks 140A, 140B, 140C can also be the same kind as the network 130. In some embodiments, the networks 140A, 140B, 140C can individually use different kind of networks.

The gateway 110A, 110B, 110C can be deployed in various geographical points in the network coverage area. The gateway 110A, 110B, 110C can be configured to connect with one or more client devices. Illustratively, the gateway 110A, 110B, 110C may include communication circuitry configured to receive data modulated in LoRa waveform and/or FSK waveform, such as modulation technology for low power consumption in wide area of the network. In some embodiments, the gateway 110A, 110B, 110C can be configured to detect one or more client devices using a LoRa communication protocol. For example, the gateway 110A, 110B, 110C can scan its surrounding area to determine whether there are any client devices by receiving a beacon signal transmitted from the client devices. The gateway 110A, 110B, 110C can detect the client devices by receiving the beacon signal from the client devices and send a response signal in response to the beacon signal. In some implementations, the beacon signal and response signal can be sent in the form of the data packet.

In some embodiments, the gateway 110A, 110B, 110C can be configured to measure signal strength of the received signal from client devices. For example, the gateway 110A, 110B, 110C receive signal from the client devices, and the signal is modulated in LoRa protocol, having a chirp signal. The gateway 110A, 110B, 110C can be configured to measure this signal by estimating over time or distance, and this estimation can generally be referred to as received signal strength (RSSI). In some embodiments, the gateway 110A, 110B, 110C transmits the measured RSSI value to the network service provider 120 via the network 130.

Illustratively, the network service provider 120 can include localization service 122 and data store 124. In some cases, the localization service 122 may process the area of the network coverage by dividing the area into multiple subregions. As previously described, in some embodiments, the individual subregion can be defined in the form of a square-shaped tile. At least some portion of a geographic region can be overlayed with a configuration of the subregions (e.g., a sequence of tiles). Each individual tile can be associated with an attributed location, such as a center point of the tile. In some embodiments, location information associated with the gateways located in each tile can be obfuscated in favor of the attributed location of the tile. In these embodiments, the gateways located within the tile can correspond to the attributed location of the tile. In some embodiments, the data store 124 stores map information that characterized with the tiles (e.g., subregions). The data store 124 may also include the list of gateways located within each tile. The list of gateways in each tile can be stored with the location associated with the attributed location of the tile, and the accurate location of the gateways is not stored in the data store. Although the sub-regions are illustratively described as being uniformly square in shape, in other embodiments, individual sub-regions may have different geometric or non-geometric shapes. Additionally, although the sub-regions are illustratively described as a center point as the attributed location, any location within the sub-regions or a plurality of locations may also be utilized in various embodiments. Accordingly, the disclosed embodiments and examples should not be construed as limiting.

In some embodiments, the localization service 122 may receive the measured strength of signals associated with a client device from one or more gateways. The localization service 122 may then identify the attributed location corresponding to the gateway that transmitted the measured signal strength. Additionally, the localization service 122 may process the received signal strength based on the identified attributed locations of the gateways. For instance, the strength of the signals received from the gateways can be normalized and weighted according to the magnitude of the signal strength. The localization service 122 can then estimate the client device's location using the weights and the attributed locations. For example, if the only data is from a first gateway at location A and a second gateway at location B, and the weight values for locations A and B are the same, the estimated location could be the point equidistant between locations A and B.

Figure 1B:
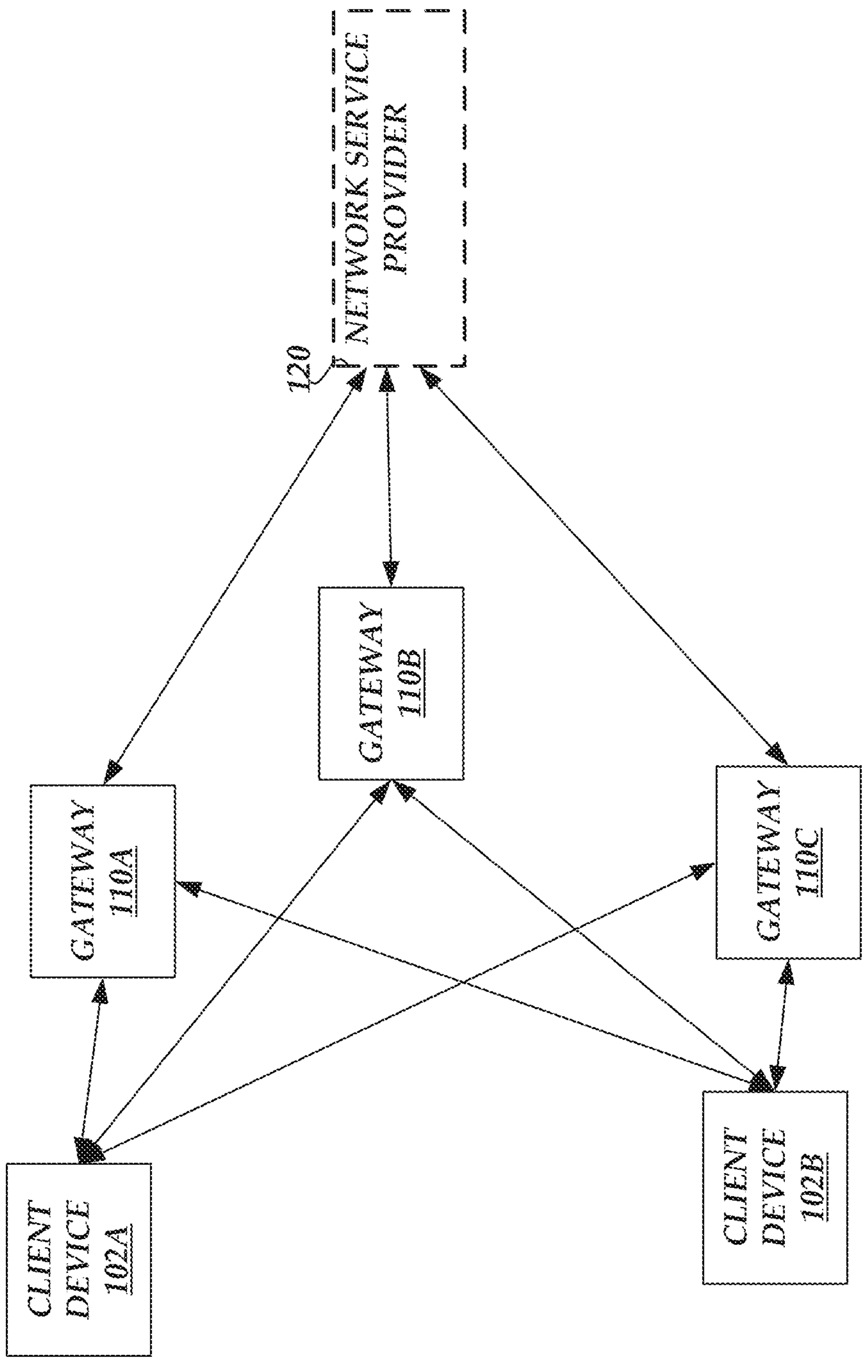
FIG. 1B depicts a block diagram of client devices, gateways, and a network service provider according to the present disclosure can be implemented.

FIG. 1B depicts a block diagram of example embodiments of the present disclosure. As shown in FIG. 1B, a client device can be connected to multiple gateways. As illustrated in FIG. 1B, the client device 102A can be connected with gateways 110A, 110B, and 110C. Also, client device 102B can be connected with gateways 110A, 110B, and 110C. In some embodiments, the client devices 102A, 102B can periodically transmit a ping signal (or beacon signal) to its surrounding direction. Illustratively, the signal generated by the device 102A, 102B can be broadcast to the plurality of gateways 110A, 110B, 110C. In some embodiments, a plurality of gateways that receive the ping signal can process the signal and transmit it to the network service provider 120. The ping signal can include LoRa packet with a preamble, header, and payloads, where the size of payloads depends on the size of the data. In some cases, the gateway may identify the client device based on the preamble. For example, gateways 110A, 110B, 110C may receive ping signal generated from client device 102A. The gateways 110A, 110B, 110C may read the preamble and determine whether the client device 102A is a registered device. For example, if gateway 110B determines that the client device 102A is not a registered device, the gateway 110B may discard the ping signal received from the client device 102A. In some embodiments, the client device 102A sends a beacon signal to the surrounding direction, and the gateway that responds to the beacon signal can be connected with the client device 102A. For example, when the client device 102A transmits the beacon signal, the gateways 110A, 110B may respond to the signal, and gateway 110C may not respond to the signal due to the distance. In this example, the client device 102A can be connected with gateways 110A, 110B.

The client devices and gateways, as described in FIGS. 1A and 1B are merely illustrated for example purposes, and the present disclosure does not limit the number of client devices and gateways.

Figure 2A:
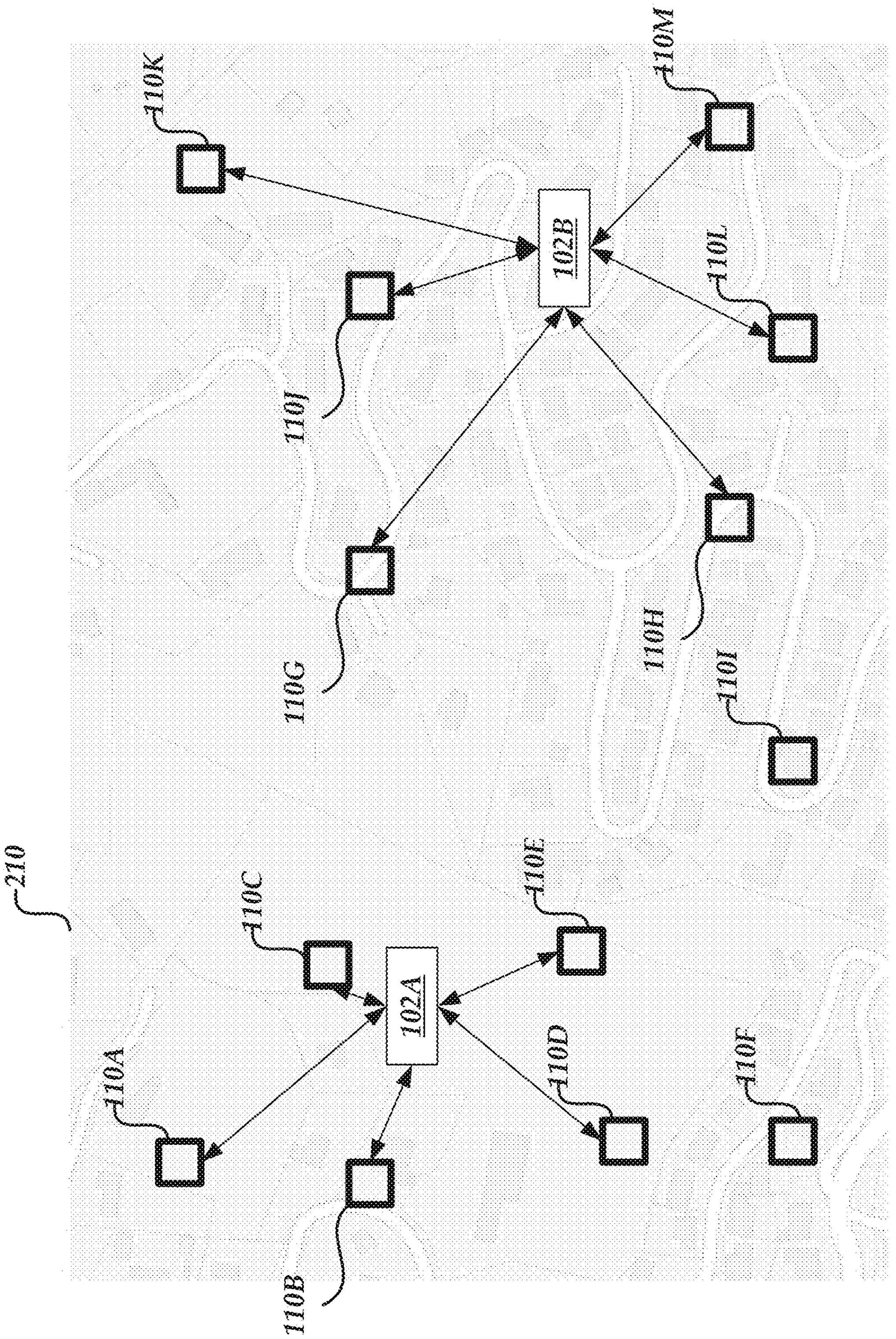
FIG. 2A depicts an example of client devices and gateways deployed in accordance with the embodiments disclosed herein.

FIG. 2A illustrates an example of client devices and gateways deployed in accordance with the embodiments disclosed herein. As depicted, client devices 102A, 102B, and gateways 110A-110M are dispersed across a local network area 210. In FIG. 2A, client device 102A is shown as connected to gateways 110A, 110B, 110C, 110D, 110E, and client device 102B is connected to gateways 110G, 110H, 110J, 110K, 110L, 110M. These connections between client devices and gateways are established via network 140, while gateways 110A-110M are linked to the network service provider via network 130. When the gateways receive a signal (e.g., a modulated signal) from the client devices, they may measure the signal's strength in terms of Received Signal Strength Indicator (RSSI). The magnitude of the RSSI might correlate with the distance to the client device 102, and thus the RSSI measured at gateway 110C would likely be the highest compared to other gateways 110A, 110B, 110D, 110E. In an example, the magnitude of the RSSI is proportional to the distance to the gateways, such that the gateway located the closest to the client device 102 has the highest magnitude of the RSSI. In some embodiments, if the quality of the signal received at a gateway is below a certain threshold, that signal might be discarded and not transmitted to the network service provider 120. For example, even though gateway 110C is located closest to client device 102A, if the Signal-to-Noise Ratio (SNR) is below a first threshold and/or the RSSI is below a second threshold, then gateway 110C would discard the signal received from the client device 102.

Figure 2B:
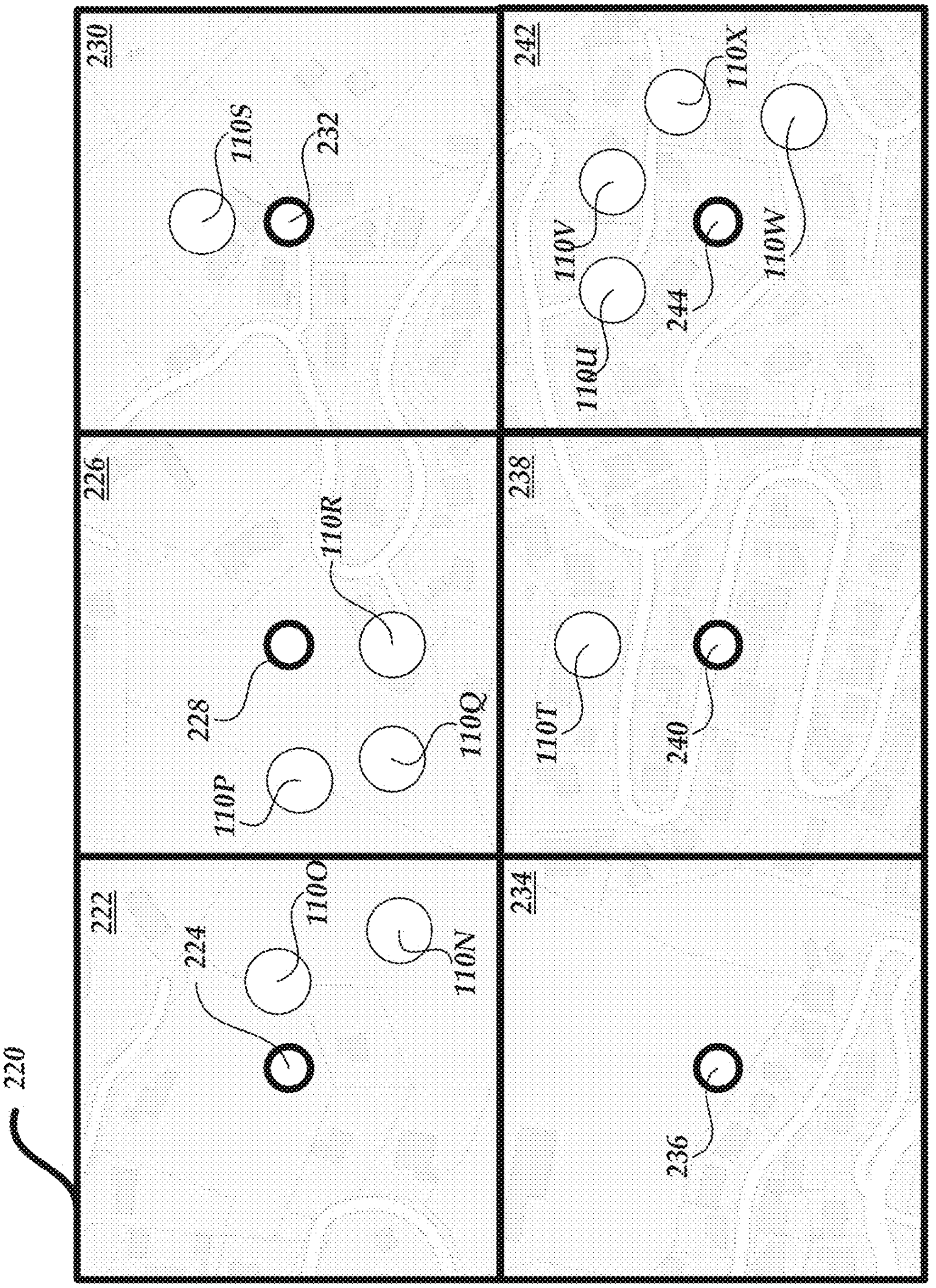
FIG. 2B is an illustrative example of obfuscating gateway location in accordance with the embodiments disclosed herein.

FIG. 2B illustrates examples of obfuscating gateway locations. As illustrated in FIG. 2B, the localization service 122 can be configured to divide the local area network 220 into subregions. As shown in FIG. 2B, the subregions 222, 226, 230, 234, 238, and 242 can be defined as tiles. The dimension of each tile could be uniformly 900 by 900 meters by way of illustration and based on the geographic area intended to be covered. However, the dimension can be modified based on specific applications, the size of the geographic area, attributes of the geography area, deployment of the gateways, and the present disclosure does not limit the dimension. Furthermore, the shape of the subregion could be an alternative shape, such as a circular shape, and the present disclosure does not limit the shape.

In some embodiments, the localization service 122 defines an attributed location for each subregion. For example, the subregions 222, 226, 230, 234, 238, and 242 can have attributed location 224, 228, 232, 236, 240, 244, respectively. The localization service 122 may obfuscate the locations for the gateways into the attributed location, so that the actual location of the gateway is obfuscated to the attributed location (which attributed location may also be characterized as an obfuscated location). For example, the locations of gateways 110N, 1100 in subregion 222 can be obfuscated to the attributed region 224. In some embodiments, the data store 124 may store an attributed (or obfuscated) location for gateways, as shown in below Table I.

TABLE I

Example of gateways locations stored in the data store

| SUBREGION | GATEWAYS | ATTRIBUTED LOCATION |
|---|---|---|
| 222 | 110N, 110O | 224 |
| 226 | 110P, 110Q, 110R | 228 |
| 230 | 110S | 232 |
| 234 | — | 236 |
| 238 | 110T | 240 |
| 242 | 110U, 110V, 110W, 110X | 244 |

Figure 2C:
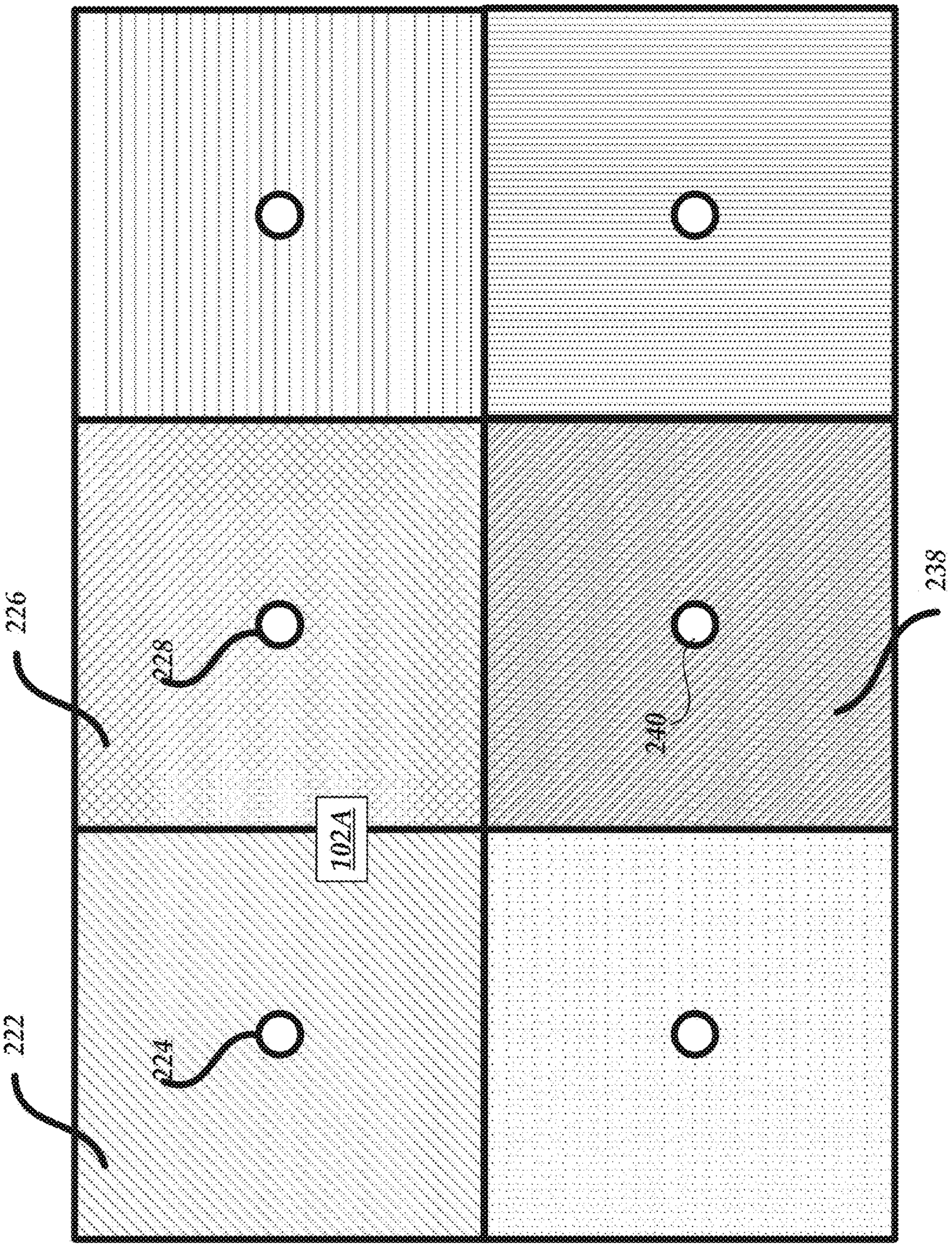
FIG. 2C is an illustrative example of estimating client device location in accordance with the embodiments disclosed herein.

FIG. 2C illustrates an example of estimating the location of client device 102A. In some embodiments, the localization service may receive, from each gateway, the measured RSSI with respect to the client device. For example, below Table II illustrates an example of the received RSSI value.

TABLE II

Illustrates an example of the received RSSI value.

| GATEWAY | RSSI |
|---|---|
| 110N | −80 dBm |
| 110O | −85 dBm |
| 110P | −80 dBm |
| 110Q | −88 dBm |
| 110R | −105 dBm |
| 110T | −118 dBm |

As described in the above Table II, in some embodiments, if the SNR is below a threshold, the gateway may discard the signal received from the client device and not transmit it to the network service provider. For example, if the noise is-100 dBm, the SNR associated with each gateways 110N, 1100, 110P, 110Q, 110R, 110T is 20 dB, 15 dB, 20 dB, 12 dB, −5 dB, and −18 dB, respectively. If the threshold is −15 dB, the gateway 110T may discard the received signal from the client device. The threshold can be determined based on received signal strength variance, e.g., RSSI variance. For instance, the threshold can be determined based on, for example, RSSI variance in the signal modulation channel, spreading factor, bandwidth, etc.

In some embodiments, the received RSSIs can be normalized based on the total RSSI values. In the above Table II, the normalized magnitude of RSSI for each gateway is shown in below Table III. In some embodiments, the RSSI measured at each gateway can be converted into a watt value (shown in the second column of Table III) and normalized, as shown in the third column of Table III.

TABLE III

| Example of normalizing RSSI. | | |
|---|---|---|
| GATEWAY | Convert dBm into watts | Normalized RSSI |
| 110N | 0.00000000001 | 0.4 |
| 110O | 0.0000000000032 | 0.13 |
| 110P | 0.00000000001 | 0.4 |
| 110Q | 0.0000000000016 | 0.06 |
| 110R | 0.000000000000032 | 0.001 |
| 110T | — | — |

Figure 3A:
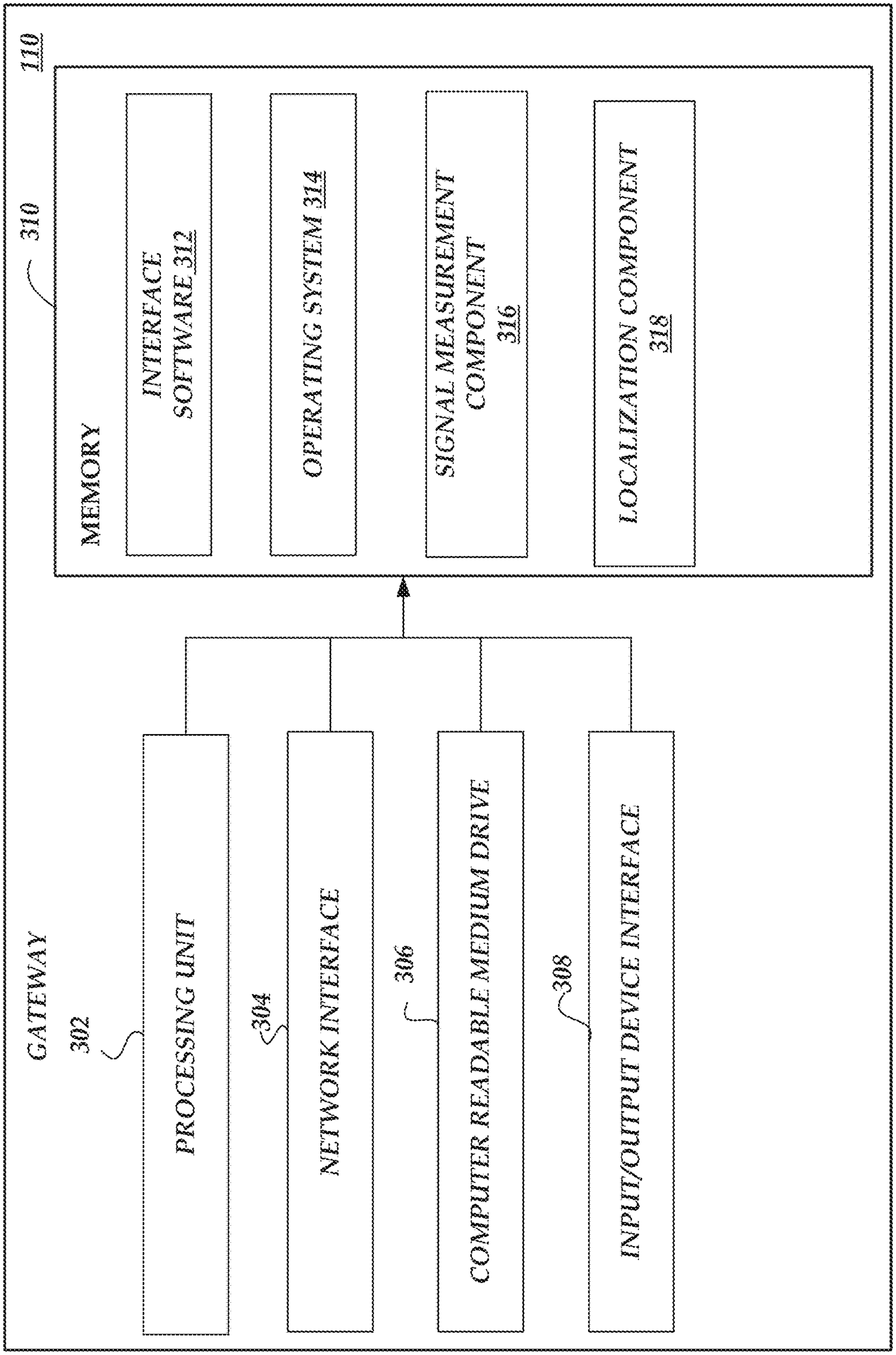
FIG. 3A is an illustrative architecture of a gateway.

FIG. 3A depicts one embodiment of an architecture of a gateway 110. The gateway can be configured to receive a signal (e.g., a modulated signal, which may be a ping or beacon) from client devices 102 and process the received signal to transmit to the network service provider 120. In some cases, the gateway 110 measures the strength of the received signal. For example, the gateway 110 may receive a signal modulated using a modulation scheme such as LoRa modulation or FSK modulation. The gateway 110, then, may measure the RSSI for the received modulated signal.

The general architecture of the gateway 110 depicted in FIG. 3A includes an arrangement of computer hardware and software/firmware components that may be used to implement aspects of the present disclosure. As illustrated, the gateway 110 includes a processing unit 302, a network interface 304, a computer-readable medium drive 306, and an input/output device interface 308, all of which may communicate with one another by way of a communication bus. The gateway 110 may be physical hardware components or implemented in a virtualized environment.

The network interface 304 may provide connectivity to one or more networks or client devices, such as the networks 1301 140 of FIG. 1A. For example, the gateway 110 can be connected with one or more client devices 102 via the network 140 and to the network service provider 120 via the network 130. The processing unit 302 may thus receive signal, data, and instructions from other computing systems or services via the networks 130, 140. The processing unit 302 may also communicate to and from memory 310 and further provide output information via the input/output device interface 308. For example, the gateway 110 may receive the modulated signal that modulated data into carrier waveform by using modulation technique via the input/output device interface 308. In addition, the gateway 110 may process the modulated signal, such as process to measure strength of the signal (e.g., RSSI) and/or demodulate the signal to identify data, and transmit the measured strength of the signal and/or the demodulated signal to the network service provider 120 via the input/output device interface 308. In some embodiments, the gateway 110 may include more (or fewer) components than those shown in FIG. 3A.

The memory 310 may include computer program instructions that the processing unit 302 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the gateway 110. The memory 310 may further include computer program instructions and other information for implementing aspects of the present disclosure. For example, in one embodiment, the memory 310 includes interface software 312 for communicating with other components or services and performing service identification and infrastructure configuration associated with the identified services.

The memory may include a signal measurement component 316 for measuring strength of the signal received from client device. In some embodiments, the signal measurement component 316 can be configured to communicate with nearby client devices 102. In some embodiments, the client devices 102 can periodically transmit pings or beacons. In some embodiments, the gateways that receive a ping signal can process the signal and transmit information (e.g., data from the signal, RSSI information, SNR information, etc.) to the network service provider 120. A ping signal can include, for example, a LoRa packet with a preamble, header (optional), and payload, where the size of payload depends on the size of the data. In some cases, the gateway 110 may identify a client device based on data conveyed as part of the payload (e.g., based on an identifier). For example, the gateways 110 may read the identifier and determine whether the client device 102 is a registered device. In some embodiments, a gateway 110 sends a beacon signal, and a client device 102 that responds to the beacon signal can establish a connection with the gateway 110. For example, gateways may send beacon messages using a frequency shift keying modulation scheme, which may allow end node devices configured for frequency shift keying communications that receive such a beacon message to establish a connection with the gateway. In some embodiments, end node devices are configured to periodically send out ping messages, e.g., at a set periodicity (such as once every ten seconds, thirty seconds, one minute, two minutes, five minutes, or ten minutes, etc.)

When a gateway such as gateway 110 receives a signal from a client device 102, the signal measurement component 316 may measure the strength of the signal. In some embodiments, the received signal from the client device 102 can be modulated using a LoRa modulation scheme or an FSK modulation scheme. The signal measurement component 316 may determine an RSSI value for the signal. In some embodiments, the signal measurement component 316 may utilize the determined RSSI to determine an SNR. In accordance with one or more implementations, to utilize the signal, the signal SNR should be higher than a threshold. The SNR can be determined based on the below equation 1.

$$SNR\ (\text{dB}) = RSSI\ (\text{dBm}) - \text{Noise floor (dBm)} \quad \text{Equation 1}$$

In some embodiments, the signal measurement component 316 may discard the signal when the SNR is less than a threshold. The threshold can be determined based on the type of modulated scheme. For example, if the signal is modulated using a LoRa modulation scheme, the threshold could be less than zero. The threshold can be determined based on received signal strength variance, such as RSSI variance. For instance, the threshold can be determined based on, for example, RSSI variance in the signal modulation channel, spreading factor, bandwidth, etc.

The memory may further include a localization component 318. In some embodiments, the gateway 110 may store its location information in the computer readable medium drive 306. Thus, the localization component 318 may provide its location information to the network service provider 120. In some scenarios, a network administrator or manager, or the like, may provide the location information and store the information into the computer readable medium drive 306.

The above-described gateway 110 functions can be implemented to the client device 102. Thus, in some embodiments, the client device 102 can function as the client device and also the gateway.

Figure 3B:
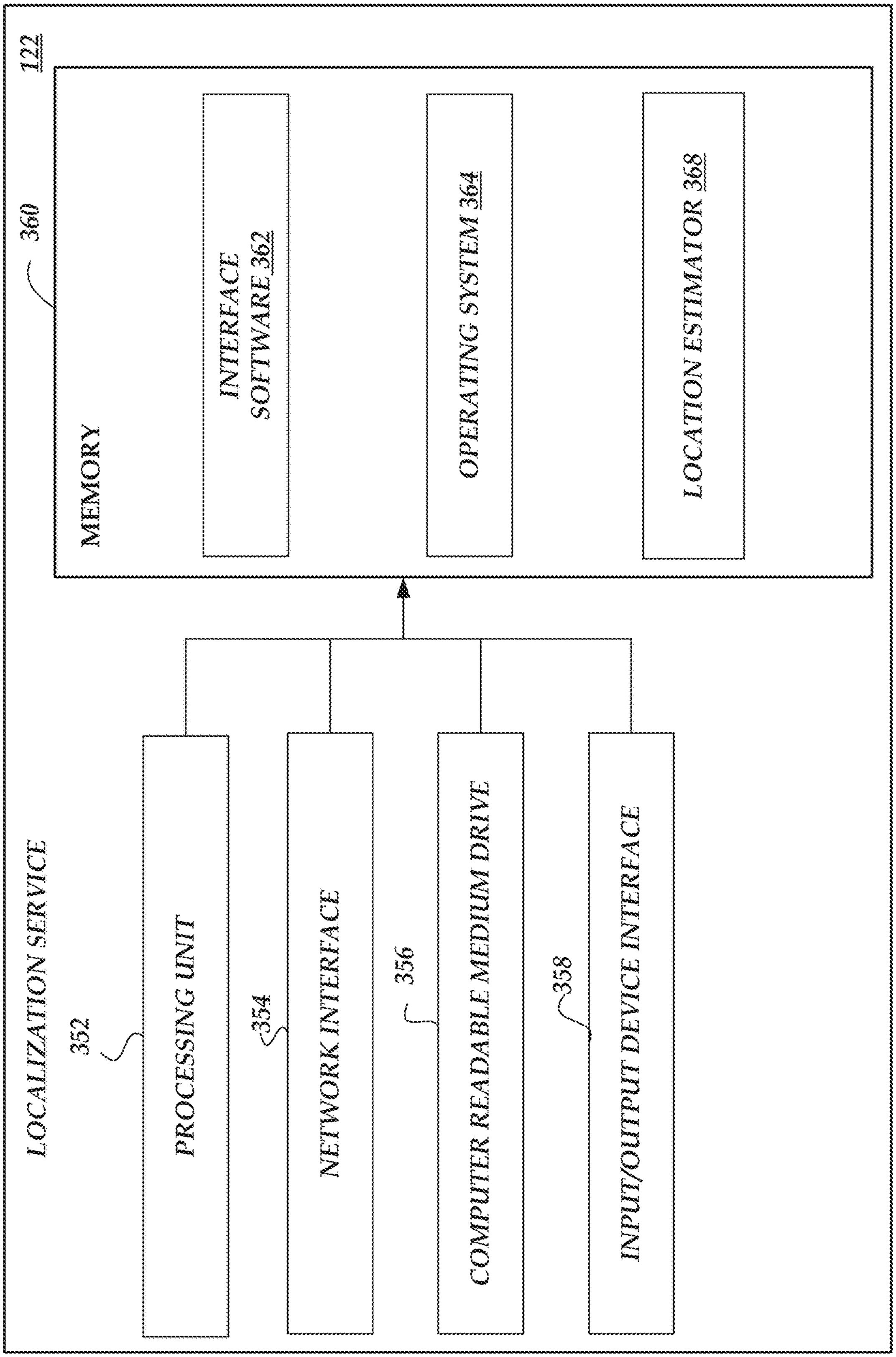
FIG. 3B is an illustrative architecture of a localization service.

FIG. 3B depicts one embodiment of an architecture of a localization service 122. The localization service 122 can be configured to estimate the client device's location based on the measured signal strength at gateways that received a signal from the client device. In some embodiments, the localization service 122 can be configured to map the local network area into a plurality of subregions. Each subregion may include an attributed or obfuscated location, where the location of gateways in each subregion can be obfuscated to the attributed location. Additionally, the localization service 122 can be configured to estimate the location of the client device based on the measured RSSI values provided by the gateways 110 that received a signal from the client device. For example, the localization service 122 receives RSSI values from the gateways 110 and uses the received RSSI values to determine an estimated location for the client device.

The general architecture of the localization service 122 depicted in FIG. 3B includes an arrangement of computer hardware and software components that may be used to implement aspects of the present disclosure. As illustrated, the localization service 122 includes one or more processing units 352, one or more network interfaces 354, one or more computer-readable medium drives 356, and may optionally include one or more input/output device interfaces 358, all of which may communicate with one another by way of a communication bus. The localization service 122 may be physical hardware components or implemented in a virtualized environment.

The network interface 354 may provide connectivity to one or more networks or computing systems, such as the network 130 of FIG. 1A. The processing unit 352 may thus receive information and instructions from other computing systems or services via a network. The processing unit 352 may also communicate to and from memory 360 and further provide output information via the input/output device interface 358. In some embodiments, the localization service 122 may include more (or fewer) components than those shown in FIG. 3B.

The memory 360 may include computer program instructions that the processing unit 352 executes in order to implement one or more embodiments. The memory 360 generally includes RAM, ROM, or other persistent or non-transitory memory. The memory 360 may store an operating system 364 that provides computer program instructions for use by the processing unit 352 in the general administration and operation of the localization service 122. The memory 360 may further include computer program instructions and other information for implementing aspects of the present disclosure. For example, in one embodiment, the memory 360 includes interface software 362 for communicating with other components or services.

In accordance with one or more implementations, a system is configured to divide a local area of the network (e.g., network coverage map) into subregions. For example, as shown in FIG. 2B, the subregions 222, 226, 230, 234, 238, and 242 can be characterized as tiles. The dimensions of each tile could be 900 by 900 meters. However, the dimension can be modified based on specific applications, and the present disclosure is not limited to any particular dimensions. Furthermore, the shape of the subregion could be an alternative shape, such as a circular shape, and the present disclosure is not limited to any particular shape.

In some embodiments, the system defines an attributed location for each subregion. For example, as described in FIG. 2B, the subregions 222, 226, 230, 234, 238, and 242 can have attributed location 224, 228, 232, 236, 240, 244, respectively. The system may obfuscate the locations for the gateways into the attributed location so that the actual location of the gateway is obfuscated to the attributed location. For example, the locations of gateways 110N, 1100 in subregion 222 can be obfuscated to the attributed region 224. In some embodiments, the data store 124 may store the gateway location without revealing its actual location, as shown in the above Table I, and/or may store an attributed or obfuscated location together with an actual location.

The system may generate data based on the attributed location corresponding to its gateways and signal strength received from these gateways. The below Table III fancifully illustrates exemplary such data.

TABLE III

An example of data for attributed locations (Reference to FIG. 2B)

| ATTRIBUTED LOCATION | GATEWAY | RSSI |
|---|---|---|
| 224 | 110N | −80 dBm |
| | 110O | −85 dBm |
| 228 | 110P | −80 dBm |
| | 110Q | −88 dBm |
| | 110R | −105 dBm |
| 240 | 110T | −118 dBm |

The memory 360 may include a location estimator 368. For the purpose of description, the location estimator 368 is described by reference to FIG. 2B and below Table IV.

TABLE IV

Example of determining weight values for each attributed location.

| ATTRIBUTED LOCATION | GATEWAY | RSSI | SNR (e.g., noise floor is 100 dBm) | Convert dBm into watt value | Weight |
|---|---|---|---|---|---|
| 224 | 110N | −80 dBm | 20 dB | 0.00000000001 | 0.4 |
| ($X_1$, $Y_1$) | 110O | −85 dBm | 15 dB | 0.0000000000032 | 0.13 |
| 228 | 110P | −80 dBm | 20 dB | 0.00000000001 | 0.4 |
| ($X_2$, $Y_1$) | 110Q | −88 dBm | 12 dB | 0.0000000000016 | 0.06 |
| | 110R | −105 dBm | −5 dB | 0.000000000000032 | 0.001 |
| 240 | 110T | −118 dBm | −18 dB | | |
| ($X_2$, $Y_2$) | | | | | |

In some embodiments, the attributed location can be characterized as a geographic coordinate. For example, the attributed location 224, 228, 232, 236, 240, and 244 shown in FIG. 2B can be represented as ($X_1$, $Y_1$), ($X_2$, $Y_1$), ($X_3$, $Y_1$), ($X_1$, $Y_2$), ($X_2$, $Y_2$), and ($X_3$, $Y_2$), respectively. The above Table IV, column 1 shows the attributed location with the coordination.

As shown in the above Table IV column 4, the SNR can be determined based on Equation 1. For example, if the noise floor is −100 dBm, the SNR associated with each gateway 110N, 1100, 110P, 110Q, 110R, 110T is 20 dB, 15 dB, 20 dB, 12 dB, −5 dB, and −18 dB, respectively. If the threshold is −15 dB, the gateway 110T may discard the received signal from the client device.

In accordance with one or more implementations, RSSI values for gateways that received a signal from an end node device are utilized to generate weight values that are in turn used to determine an estimated location for the end node device.

In order to determine weight values, first, the RSSI values can each be converted into a watt value, as shown in Table IV, column 5. A weight value for each gateway can then be calculated utilizing the following Equation 2.

$$\text{weight}_{k_i} = \frac{10^{RSSI_{i,ki}/10}}{\sum_{k_i=1}^{D} 10^{RSSI_{i,ki}/10}} \quad \text{Equation 2}$$

For example, a ping message i from an end node device is received at $D_i$ gateways, e.g., at $D_i=5$ gateways (or perhaps received at six gateways with it being discarded from one owing to SNR being below a threshold). $k_i$ represents a set of gateways, e.g. $k_i=1, \ldots D_i$. The attributed or obfuscated location of a particular gateway $k_i$ in the set can be represented as $(X_{ki}, y_{ki})$. An RSSI value (e.g. a despreaded RSSI value) for a gateway $k_i$ in the set can be represented as $RSSI_{i,k_i}$. A weight $w_{k_i}$ for each gateway can be calculated based on all of the RSSI values. Specifically, a converted watt value for a gateway is normalized based on determined watt values for all of the gateways and then used as a weight. For example, applying Equation 2 to the above converted dBm into a watt value column, the weight for the gateway 110N can be determined as $$\frac{0.00000000001}{\begin{array}{c}0.00000000001 + 0.0000000000032 + 0.00000000001 + \\ 0.0000000000016 + 0.000000000000032\end{array}} = 0.4.$$

Thus, the weight corresponding to the attributed location 224 included in the subregion 222 may correspond to 0.53 (sum of 0.4 and 0.13). Also, the normalized RSSI corresponding to the attributed location 228 included in the subregion 226 may correspond to 0.461 (sum of 0.4, 0.06, and 0.001). In accordance with one or more implementations, the location of the client device 102 can be estimated as shown in FIG. 2C, such that the client device 102 is located approximately in the middle of attributed locations 224, 228.

In accordance with one or more implementations, an estimated position (x,y) is determined based on summing together weighted position data for each of the gateways, e.g.:

$$(x_i, y_i) = \sum_{ki=1}^{Di} wk_i(xk_i, yk_i).$$

Thus, substituting exemplary locations for x1, x2, y1, and y2 as illustrated in Table 5 below:

$$x_i = 1*.4 + 1*.13 + 2*.4 + 2*.06 + 2*.001 = 1.452$$

$$y_i = 3*.4 + 3*.13 + 3*.4 + 3*.06 + 3*.001 = 2.973$$

That is, the estimated coordinates for the end node device based on ping $p_i$ is (1.452, 2.973).

In accordance with one or more implementations, data from multiple pings may be used, or data for a single ping may be used, etc. In accordance with one or more implementations, data for all pings within a set amount of time from a current time may be used. In accordance with one or more implementations, data for the most recent ping for a configured number of gateways may be used. In accordance with one or more implementations, only data for a most recent ping or most recent set of pings, is used.

Figure 4:
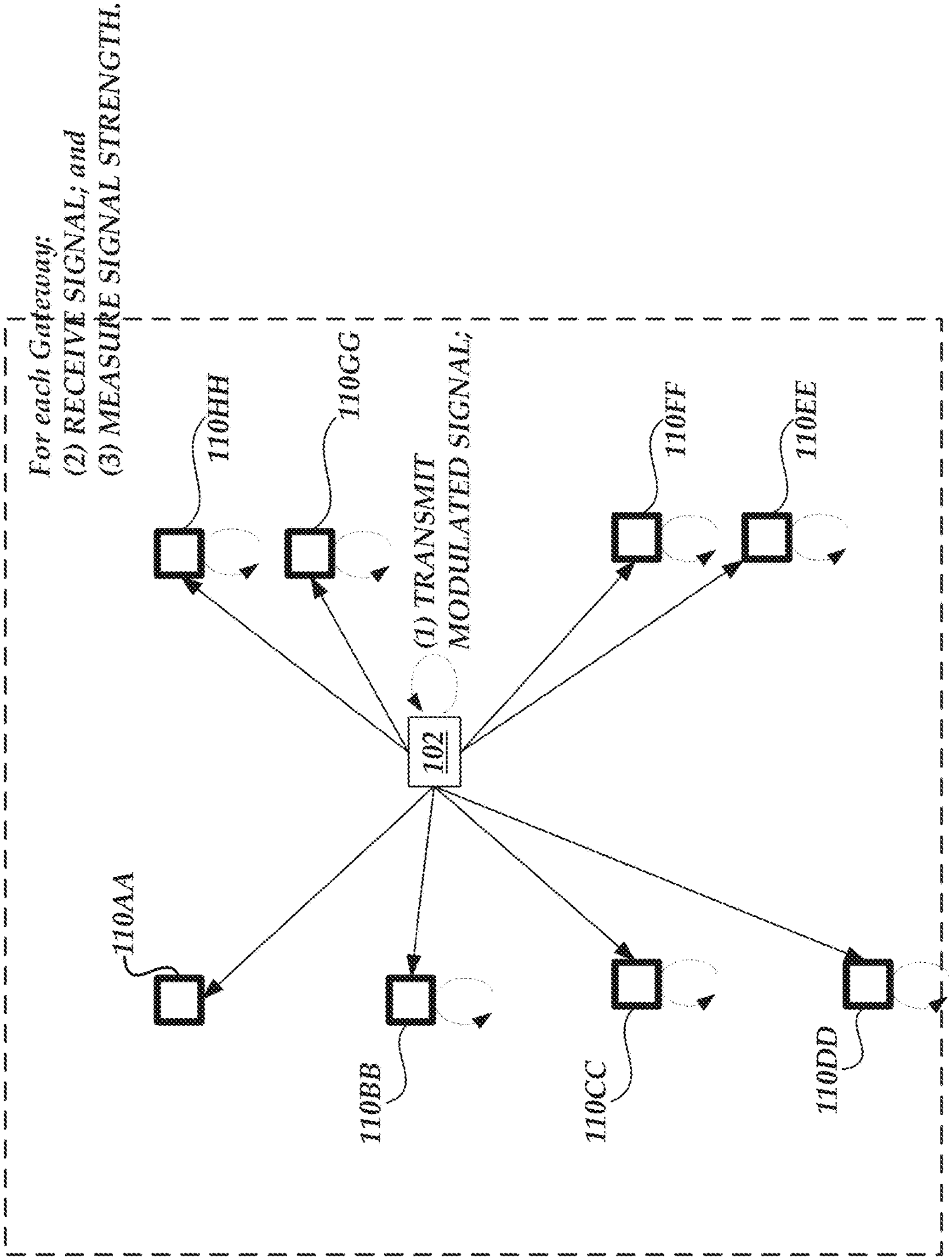
FIG. 4 is an illustrative interaction of the gateways and a client device.

Turning now to FIG. 4, illustrative interactions of the gateways 110 and client device 102 are described. The interaction is illustrative. At (1), the client device 102 transmits a modulated signal that is received by gateways 110AA-110HH. In some embodiments, the client devices 102 may periodically transmit a ping signal (or beacon signal). The gateways (gateways 110AA-110HH in this FIG. 4) that receive the ping signal can process the signal and transmit to the network service provider 120. In some cases, the gateways 110AA-110HH may identify the client device 102 based on the signal. For example, the gateways 110AA-110HH may read an identifier in a payload of a wireless packet and determine whether the client device 102 is a registered device.

At (2), the gateways 110AA-110HH receive the signal from the client device 102.

Aat (3), the gateways 110AA-110HH measure signal strength. Once the gateways 110AA-110HH receive the signal from the client device 102, each gateway may measure the strength of the signal.

In some embodiments, the gateways 110AA-110HH may discard the signal when the SNR is less than a threshold. The threshold can be determined based on the modulation scheme. For example, if the signal is modulated by using a LoRa modulation scheme, the threshold could be less than zero.

Figure 5A:
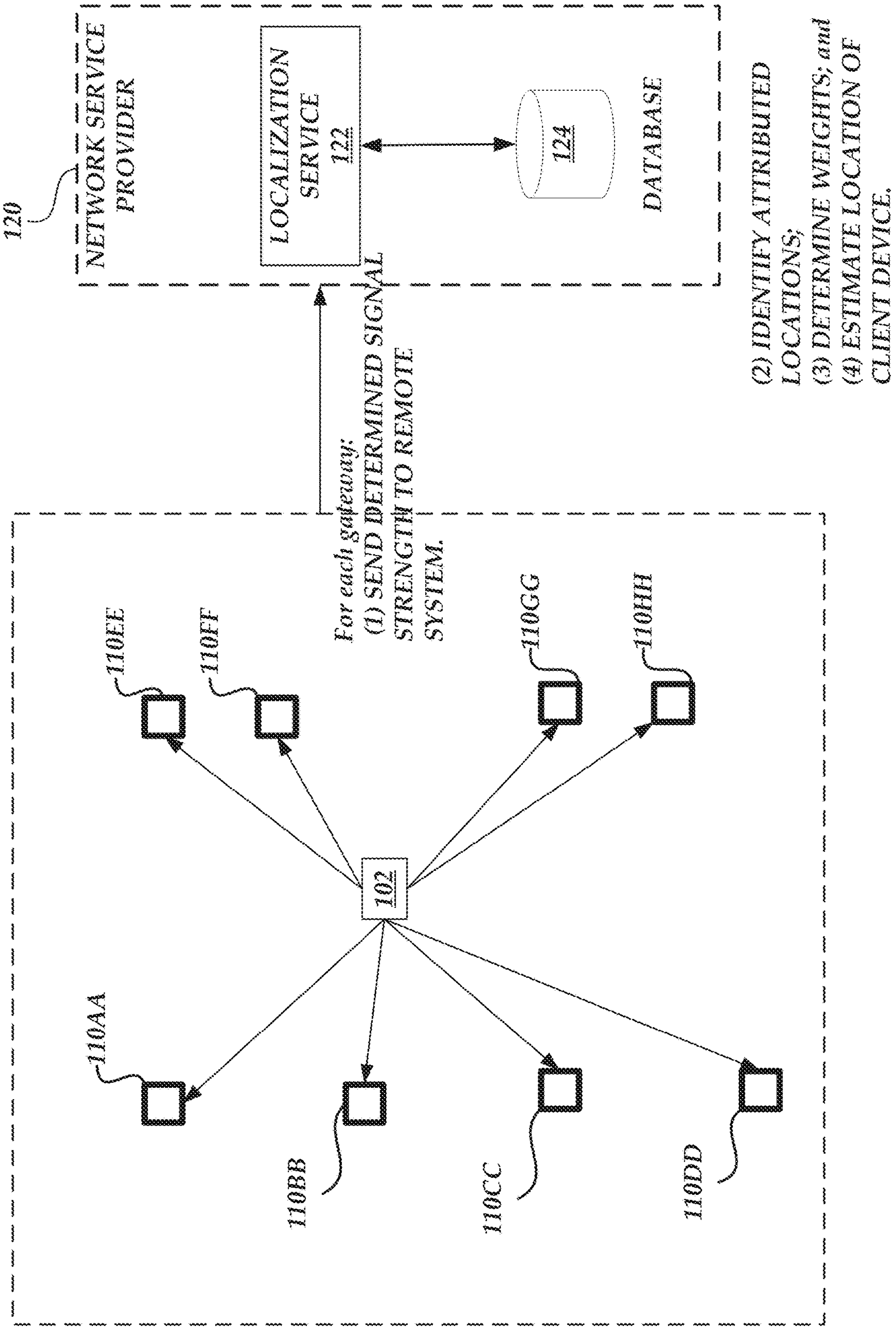
FIG. 5A is an illustrative interaction of the gateways and localization service.

Turning now to FIG. 5A, illustrative interactions of the gateways 110 and localization service 122 are described. At (1), each gateway transmits determined information such as determined signal strength information (e.g., RSSI) to the localization service 122.

Figure 5B:
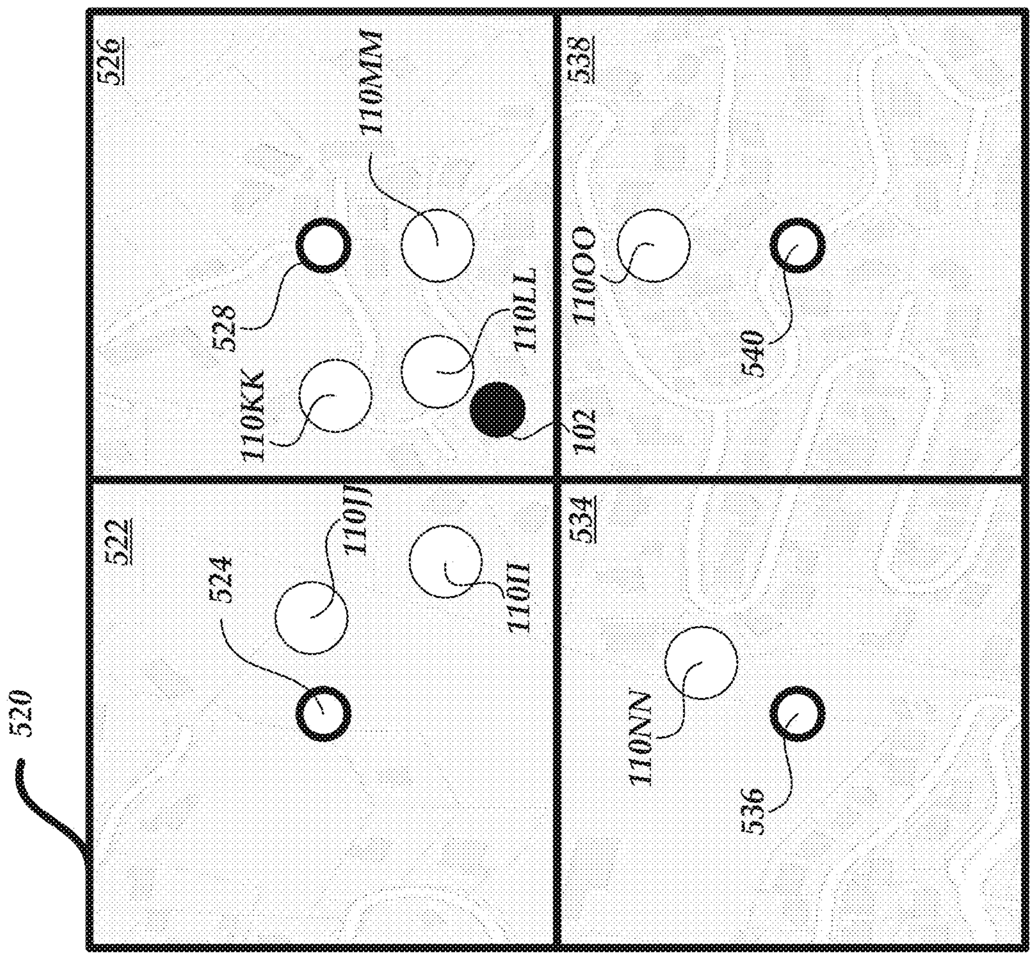
FIG. 5B is an illustrative example of obfuscating gateways into attributed locations.

At (2), the localization service 122 identifies attributed locations for each gateway for which signal strength information for a particular signal or end node device was received. This may involve first identifying gateways for which signal strength information for a particular signal or end node device was received, and then determining attributed locations for those gateways. The step (2) is described with reference to the above FIG. 5B. As shown in FIG. 5B, the subregions 522, 526, 534, and 538 can be defined as tiles. The dimension of each tile could be 900 by 900 meters. However, the dimension can be modified based on specific applications, and the present disclosure does not limit the dimension. Furthermore, the shape of the subregion could be an alternative shape, such as a circular shape, and the present disclosure does not limit the shape.

In some embodiments, the localization service 122 defines an attributed location for each subregion. The attributed location can be the center of the subregion. For example, as described in FIG. 5B, the subregions 522, 526, 534, and 538 can have attributed location 524, 528, 536, and 540, respectively. The localization service 122 may obfuscate the locations for the gateways into the attributed location, so that the actual location of the gateway is obfuscated to the attributed location. The Table V illustrates an example of Table that represent the subregion, attributed location, and gateways.

TABLE V

An example of Table based on the attributed location corresponding to its gateways and subregions. (Reference to FIG. 5B)

| SUBREGION | ATTRIBUTED LOCATION | GATEWAY |
|---|---|---|
| 522 | 524 | 110AA |
| | | 110BB |
| 526 | 528 | 110CC |
| | | 110DD |
| | | 110EE |
| 534 | 536 | 110FF |
| 538 | 540 | 110GG |

As shown in Table V, each subregion includes an attributed location, and the gateways located in the subregion are listed associated with the attributed location. In some embodiments, the network service provider 120 stores the gateways located in the subregion by associating with the attributed location in the data store 128.

At (3), the localization service 122 determines a weight for each gateway or RSSI measurement (in accordance with one or more implementations, multiple RSSI measurements for different signals from a single gateway could even be used), e.g. as described above.

Figure 6:
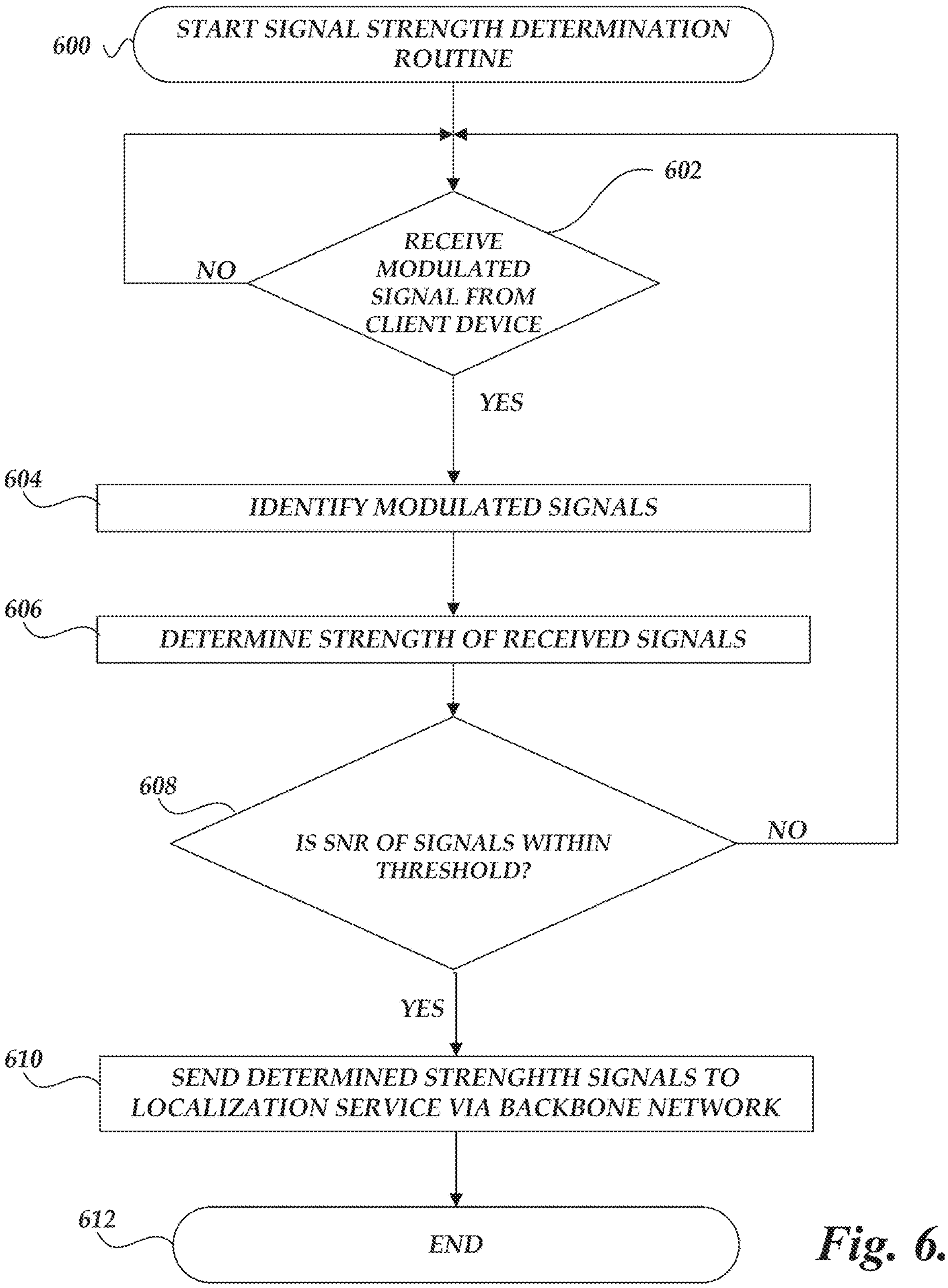
FIG. 6 is a flow diagram illustrative of a signal strength determination routine by utilizing the gateway in accordance with illustrative aspects of the present disclosure.

At (4), the localization service approximates the location of the client device using the determined weights, e.g., as described above. Turning now to FIG. 6, a routine 600 for signal strength determination routine by utilizing the gateway 110 will be described.

Turning now to FIG. 6, a routine 600 for signal strength determination routine will be described.

At decision block 602, the gateway 110 evaluates whether it has received the modulated signal from the client device. At block 604, the gateway identifies the modulated signals. At block 606, the gateway determines the strength of the received signals. In some embodiments, the gateway may measure the strength of the signal in RSSI.

At decision block 608, the gateway compares an SNR of the signal to a threshold. Illustratively, to utilize the signal, the signal needs to have its SNR higher than a threshold. The SNR can be determined based on the above equation 1. If the SNR is at or higher than the threshold, the routine proceeds to block 610. However, if the SNR is less than the threshold, the gateway may discard the signal and return to block 602. At decision block 610, the gateway sends the determined RSSI to the localization service via the backbone network 130. The routine ends at block 612.

Depending on the embodiment, certain acts, events, criteria, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method comprising:

receiving, from a first gateway, a first signal strength value corresponding to a first transmission by a first electronic device;

receiving, from a second gateway, a second signal strength value corresponding to the first transmission by the first electronic device;

determining a first region that the first gateway is located within;

based on the determining of the first region that the first gateway is located within, determining a first obfuscated location for the first gateway;

determining a second region that the second gateway is located within;

based on the determining of the second region that the second gateway is located within, determining a second obfuscated location for the second gateway;

determining a first weight value associated with the first gateway based on the first signal strength value and the second signal strength value;

determining a second weight value associated with the second gateway based on the second signal strength value and the first signal strength value; and determining a first location of the first electronic device based on the first weight value, the second weight value, the first obfuscated location, and the second obfuscated location.

2. The method of claim 1, wherein the method comprises converting the first signal strength value from a decibel value to a first watt value and converting the second signal strength value from a decibel value to a second watt value, and wherein the first weight value is determined based on dividing the first watt value by a sum of a set of watt values that includes the first watt value and the second watt value.

3. The method of claim 1, wherein the method further comprises:

receiving, from a third gateway, a third signal strength value corresponding to the first transmission by the first electronic device;

determining a third region that the third gateway is located within;

based on the determining of the third region that the third gateway is located within, determining a third obfuscated location for the third gateway; and determining a third weight value associated with the third gateway based on the third signal strength value and the first signal strength value;

wherein the first location is determined based on the third weight value.

4. A method comprising:

receiving, from a first gateway, a first signal strength value associated with a first transmission by a first electronic device;

receiving, from a second gateway, a second signal strength value associated with the first transmission by the first electronic device;

determining a first obfuscated location for the first gateway;

determining a second obfuscated location for the second gateway;

converting the first signal strength value from a decibel value to a first watt value;

converting the second signal strength value from a decibel value to a second watt value;

determining a first weight value based on dividing the first watt value by a sum of a set of watt values that includes the first watt value and the second watt value;

determining a second weight value based on dividing the second watt value by a sum of a set of watt values that includes the first watt value and the second watt value; and determining a first location of the first electronic device based on the first signal strength value, the second signal strength value, the first obfuscated location, and the second obfuscated location, wherein the determining of the first location of the first electronic device is based on the first weight value and the second weight value.

5. The method of claim 4, wherein the method further comprises:

determining a first region that the first gateway is located within; and determining a second region that the second gateway is located within;

wherein the determining of the first obfuscated location is based on the determining of the first region; and wherein the determining of the second obfuscated location is based on the determining of the second region.

6. The method of claim 4, wherein the method further comprises:

receiving, from a third gateway, a third signal strength value associated with the first transmission by the first electronic device; and determining a third obfuscated location for the third gateway;

wherein the first location is determined based on the third obfuscated location for the third gateway.

7. The method of claim 4, wherein the method further comprises:

receiving, from a third gateway, a third signal strength value associated with the first transmission by the first electronic device;

determining a third obfuscated location for the third gateway;

determining a first weight value associated with the first gateway based on the first signal strength value, the second signal strength value, and the third signal strength value; and determining a second weight value associated with the second gateway based on the first signal strength value, the second signal strength value, and the third signal strength value;

determining a third weight value associated with the third gateway based on the first signal strength value, the second signal strength value, and the third signal strength value;

wherein the first location is determined based on the first weight value, the second weight value, and the third weight value.

8. The method of claim 4, wherein the method further comprises:

receiving, from a third gateway, a third signal strength value associated with the first transmission by the first electronic device;

determining a third obfuscated location for the third gateway;

converting the first signal strength value from a decibel value to a first watt value;

converting the second signal strength value from a decibel value to a second watt value;

converting the third signal strength value from a decibel value to a third watt value;

determining a first weight value associated with the first obfuscated location based on dividing the first watt value by a sum of a set of watt values that includes the first watt value, the second watt value, and the third watt value;

determining a second weight value associated with the second obfuscated location based on dividing the second watt value by a sum of a set of watt values that includes the first watt value, the second watt value, and the third watt value; and determining a third weight value associated with the third obfuscated location based on dividing the third watt value by a sum of a set of watt values that includes the first watt value, the second watt value, and the third watt value;

wherein the first location is determined based on the first weight value, the second weight value, and the third weight value.

9. The method of claim 8, wherein the method further comprises:

determining a first product value based on multiplying the first weight value associated with the first obfuscated location by a first coordinate value for the first obfuscated location;

determining a second product value based on multiplying the second weight value associated with the second obfuscated location by a second coordinate value for the second obfuscated location;

determining a third product value based on multiplying the third weight value associated with the third obfuscated location by a third coordinate value for the third obfuscated location; and determining a first coordinate value based on summing a plurality of values including the first product value, the second product value, and the third product value;

wherein the first coordinate value corresponds to a coordinate of the first location.

10. The method of claim 4, wherein the method further comprises:

determining a first weight value associated with the first gateway based on the first signal strength value and the second signal strength value;

determining a second weight value associated with the second gateway based on the second signal strength value and the first signal strength value;

determining a first product value based on multiplying the first weight value associated with the first obfuscated location by a first coordinate value for the first obfuscated location;

determining a second product value based on multiplying the second weight value associated with the second obfuscated location by a second coordinate value for the second obfuscated location; and determining a first coordinate value based on summing a plurality of values including the first product value and the second product value;

wherein the first coordinate value corresponds to a coordinate of the first location.

11. The method of claim 4, wherein the method further comprises:

converting the first signal strength value from a decibel value to a first watt value;

converting the second signal strength value from a decibel value to a second watt value;

determining a first weight value based on dividing the first watt value by a sum of a set of watt values that includes the first watt value and the second watt value;

determining a second weight value based on dividing the second watt value by a sum of a set of watt values that includes the first watt value and the second watt value;

determining a first product value based on multiplying the first weight value associated with the first obfuscated location by a first coordinate value for the first obfuscated location;

determining a second product value based on multiplying the second weight value associated with the second obfuscated location by a second coordinate value for the second obfuscated location; and determining a first coordinate value based on summing a plurality of values including the first product value and the second product value;

wherein the first coordinate value corresponds to a coordinate of the first location.

12. The method of claim 4, wherein the first signal strength value and the second signal strength value correspond to the same transmission by the first electronic device.

13. The method of claim 4, wherein the first signal strength value and the second signal strength value correspond to different transmissions by the first electronic device.

14. The method of claim 4, wherein the first obfuscated location and the second obfuscated location each differ from a true geographical position of the corresponding gateway.

15. The method of claim 4, further comprising determining a signal-to-noise ratio for at least one of the first gateway or the second gateway, and excluding the corresponding signal strength value from use in determining the first location when the signal-to-noise ratio is below a threshold.

16. A method comprising:

receiving, from a first gateway, a first signal strength value determined by the first gateway for a signal transmitted by a first electronic device;

receiving, from a second gateway, a second signal strength value determined by the second gateway for a signal transmitted by the first electronic device;

determining a first obfuscated location for the first gateway;

determining a second obfuscated location for the second gateway;

determining a first region that the first gateway is located within;

determining a second region that the second gateway is located within; and determining a first location of the first electronic device based on the first signal strength value, the second signal strength value, the first obfuscated location, and the second obfuscated location, wherein the determining of the first obfuscated location is based on the determining of the first region, and wherein the determining of the second obfuscated location is based on the determining of the second region.

17. The method of claim 16, wherein the method further comprises:

determining a first weight value associated with the first gateway based on the first signal strength value and the second signal strength value; and determining a second weight value associated with the second gateway based on the second signal strength value and the first signal strength value;

wherein the determining of the first location of the first electronic device is based on the first weight value and the second weight value.

18. The method of claim 16, wherein the method further comprises:

converting the first signal strength value from a decibel value to a first watt value;

converting the second signal strength value from a decibel value to a second watt value;

determining a first weight value based on dividing the first watt value by a sum of a set of watt values that includes the first watt value and the second watt value; and determining a second weight value based on dividing the second watt value by a sum of a set of watt values that includes the first watt value and the second watt value;

wherein the determining of the first location of the first electronic device is based on the first weight value and the second weight value.

19. The method of claim 16, wherein the method further comprises:

receiving, from a third gateway, a third signal strength value determined by the first gateway for a signal transmitted by the first electronic device; and determining a third obfuscated location for the third gateway;

wherein the first location is determined based on the third obfuscated location for the third gateway.

20. The method of claim 16, wherein determining the first obfuscated location comprises assigning, to the first gateway, an attributed location corresponding to a subregion in which the first gateway is located, and determining the second obfuscated location comprises assigning, to the second gateway, an attributed location corresponding to a subregion in which the second gateway is located.

* * * * *